(12) United States Patent
Schlecht et al.

(10) Patent No.: US 6,930,592 B2
(45) Date of Patent: Aug. 16, 2005

(54) SYSTEM FOR PROTECTING THE LOADING SPACE OF VEHICLES

(75) Inventors: Werner P. Schlecht, Vaihingen-Enz (DE); Andreas Kobiela, Neckartenzlingen (DE); Klaus Haspel, Rottenburg (DE); Thomas Laudenbach, Rottenburg (DE); Thomas Seeg, Ostfildern (DE)

(73) Assignee: BOS GmbH & Co., KG, Ostfildern (DE)

( * ) Notice: Subject to any disclaimer, the term of this patent is extended or adjusted under 35 U.S.C. 154(b) by 69 days.

(21) Appl. No.: 10/606,662

(22) Filed: Jun. 26, 2003

(65) Prior Publication Data
US 2004/0035631 A1 Feb. 26, 2004

(30) Foreign Application Priority Data
Jun. 28, 2002 (DE) ......................................... 102 29 815

(51) Int. Cl.[7] ............................................. B60R 25/10
(52) U.S. Cl. ..................... 340/426.29; 340/426.1; 340/426.15; 340/426.16; 340/541; 340/571; 340/568.1
(58) Field of Search .................. 340/426.29, 426.1, 340/426.15, 426.16, 541, 568.1, 571, 665, 666, 540; 180/271; 701/45, 29, 200, 213; 280/748, 749; 160/265, 310; 296/66, 68.1, 65.09, 37.16

(56) References Cited

U.S. PATENT DOCUMENTS

| | | | |
|---|---|---|---|
| 5,839,757 A | * 11/1998 | von Lange et al. | ......... 280/749 |
| 5,957,522 A | 9/1999 | Matsuhashi et al. | |
| 5,971,433 A | 10/1999 | Ament et al. | |
| 6,004,084 A | * 12/1999 | Moker | ......... 410/118 |
| 6,177,876 B1 | * 1/2001 | Krueger | ......... 340/666 |
| 6,349,986 B1 | 2/2002 | Seel et al. | |
| 2001/0030599 A1 | 10/2001 | Zimmermann et al. | |

FOREIGN PATENT DOCUMENTS

| | | |
|---|---|---|
| DE | 196 45 503 A1 | 5/1997 |
| GB | 2 334 488 A | 8/1999 |

* cited by examiner

Primary Examiner—Hung Nguyen
(74) Attorney, Agent, or Firm—Flynn, Thiel, Boutell & Tanis, P.C.

(57) ABSTRACT

A system for protecting the loading space of vehicles, in particular passenger cars, with sensors for sensing loaded material in the loading space, detectors for sensing the state of protective devices in the loading space and being configured for signal generation indicative of the state of the loaded material and as a function of the sensing of loaded material and the sensing of the state of the protective devices.

20 Claims, 6 Drawing Sheets

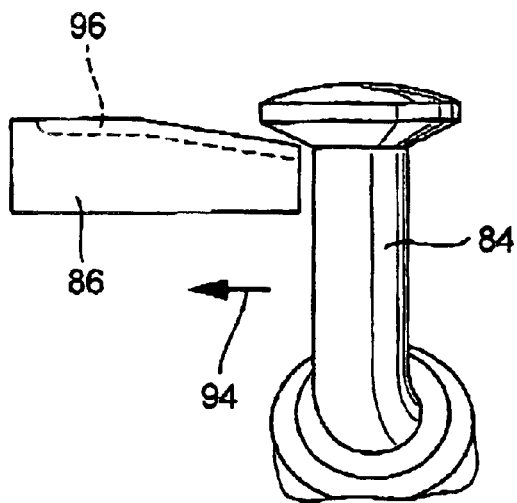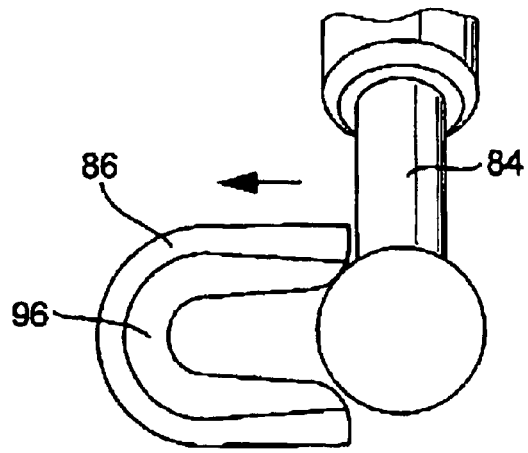
Fig. 5a   Fig. 5b
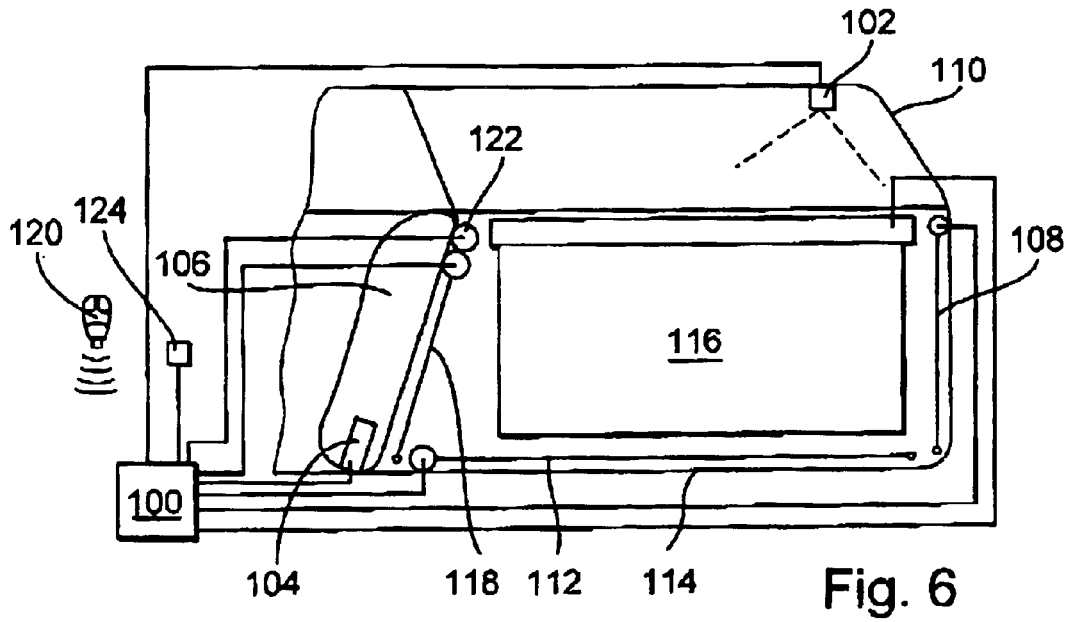
Fig. 6
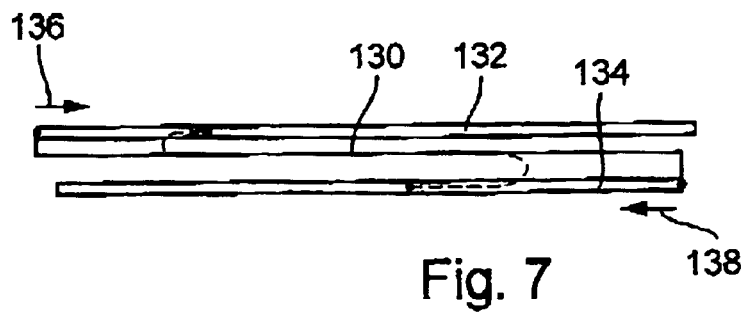
Fig. 7

SYSTEM FOR PROTECTING THE LOADING SPACE OF VEHICLES

FIELD OF THE INVENTION

The invention relates to a system for protecting the loading space of vehicles, in particular passenger cars.

BACKGROUND OF THE INVENTION

Systems for protecting the loading space of vehicles which have various protective devices are known. For example, what is referred to as a separating net can be arranged in a storage space of a modern estate car (or station wagon) between the upper edge of the backrest of the rear seat and the roof of the vehicle and which, in the stretched-out state, prevents objects from the loading space entering the passenger compartment in the event of a collision. Furthermore, horizontally extending loading space covers are known which prevent passers by seeing loaded material in the loading space. Such loading space covers can also be of crash-proof design so that, like a separating net, they prevent loaded material entering the passenger compartment in the case of a crash.

Furthermore, concealing devices or sun protection devices are known which are arranged on side windows or rear windows of a vehicle and can be extended. Conventional protective devices have to be activated by a user of the vehicle or even pulled out manually. As a result, in many cases, the activation or pulling-out of the respectively suitable protective devices does not take place. This can lead to considerable safety risks for the occupants of a vehicle if a separating net is not pulled out when there is loaded material in the loading space.

The invention is intended to improve the safety and the operating comfort in vehicles.

SUMMARY OF THE INVENTION

For this purpose, according to the invention a system is provided for protecting the loading space of vehicles, in particular passenger cars, in which sensors for sensing loaded material in the loading space or means for sensing the state of protective devices in the loading space and means for generating a loading space state signal are provided as a function of the sensing of loaded material and of the sensing of the state of the protective device.

As loaded material is sensed in the loading space and the state of protective devices is sensed, the necessary information for generating a loading space state signal is available. Such a loading space state signal can indicate, for example, a state which is safe for driving and/or a state which is unsafe. A state which is safe for driving would be indicated, for example, if there is no loaded material in the loading space as the state of a separating net or of a crash-proof loading space seal would then be irrelevant. However, if there is, for example, loaded material in the loading space and neither a crash-proof loading space cover nor a separating net is extended, a loading space state signal which indicates an unsafe state would be generated. The generated loading space state signal may be, for example, displayed to a driver of a vehicle by means of different-colored signal lamps, or in some other way. The loading space state signal may have different priorities, for example a state which is safe for driving, potentially hazardous but still safe for driving and unsafe state, not ready for driving. Depending on the loading space state signal and its priority it is possible, for example, also to intervene in the starting process of the vehicle. Moreover, it is conceivable, depending on the loading space state signal, to output a recommendation, for example that, when loaded material is present, a separating net and/or a loading space cover are extended, and concealing devices are extended when the vehicle is parked. Concealing devices and anti-impact devices as well as moveable loading space boundary elements may be provided as protective devices. Moreover, it is also possible to provide devices for protecting against soiling, such as extendable tarpaulins or covers. Examples of protective devices and loading space boundary elements are, for example, foldable backrests, extendable separating nets and extendable loading space covers, loading space compartments by means of separating nets or the like, intermediate floors which can be extended or inserted and concealing devices or sun protective devices. In order to sense the state of protective devices in the loading space, for example, sensors are provided which sense crash-proof locking or crash-proof arrangement of a separation net or a loading space cover. It is also possible, for example, to use photoelectric barriers and the like. It is also possible to detect, for example, the inserted state of a securing belt. The states of the individual protective devices can be displayed by means of a message on a driver's dashboard.

An example of a system according to the invention for protecting a loading space is, for example, an estate car with electrically activated loading space cover and electrically activated separating net. Either a contact switch at the rear end of the loading space cover or a means of monitoring the motor current of the driver of the loading space cover is used as the sensor for sensing the loaded materials. After tailgate closes, the loading space cover closes automatically. If the loading space cover cannot close as loaded material is in the way in the loading space, this is detected by the contact switches at the rear end of the loading space cover or a means for monitoring the motor current. The loading space cover then moves back automatically into its home position and the restraint system, the electrically extendable separating net, is automatically moved into the protective position. If the separating net is in its completely extended position, a safe loading space state is signaled. If the separating net cannot be extended into its protective position, an unsafe loading space state is signaled.

Sensors for sensing loaded material in terms of its position, size and weight are provided in a development of the invention.

The sensing of the position of loaded material is expedient as there is a potential hazard if the loaded material is positioned unfavorably, for example at the rear end of the loading space. It would be possible to issue, as a function of the loading space state signal, a recommendation signal which recommends moving the loaded material into a secure position directly behind a rear seat bench. The sensing of the size of the loaded material is expedient in order to take up or recommend different protective measures as a function of the size of the loaded material. For example, the extension of a crash-proof loading space cover is appropriate only if the loaded material is of a size to fit under the loading space cover. If the loaded material exceeds the level of the loading space cover, a separating net must be installed. The sensors used may be, for example, switching mats, in particular on the floor of the loading space, force sensors, pressure sensors, optical sensors such as infrared sensors, photoelectric barriers or the like. The use of a camera and downstream image processing software is also based on optical principles. The sensing of loaded material is also possible, for example, by means of ultrasonic sensors or radar systems.

In a development of the invention, the sensors for sensing loaded material are components of a vehicle protection system.

For example, the sensors of an alarm system of a means for monitoring the passenger compartment by means of infrared sensors or ultrasonic sensors may be used. The signal of such sensors which is actually provided for monitoring the passenger compartment and for protecting against theft can also be evaluated in terms of the presence or the state of loaded material in the loading space.

In a development of the invention, the means for sensing the state of protective devices have a transmitter or receiver which is arranged on a mobile protective device, and a receiver or transmitter which is arranged on the vehicle.

It is possible to arrange a transmitter in a fold-out ski bag, which transmitter is detected, in the folded-out state of the ski bag, by a receiver which is fixed to the vehicle. The use of what are referred to as transponders, which are arranged on mobile protective devices and which do not require any cable-bound power supply, is particularly advantageous.

In a development of the invention, protective devices are placed automatically in a predefined position as a function of the loading space state signal.

These measures enable a vehicle to be placed automatically in an optimum state by means of the protective devices. For example, a separating net or a crash-proof loading space cover can be extended automatically when loaded material is present so that a state which is safe for driving is also brought about without the manual intervention of the driver of the vehicle. In addition to safety aspects, in this way it is possible to significantly increase the comfort. For example, the division of the loading space can also be changed as a function of the position or the size of loaded material in the loading space by, for example, extending separating nets in order to automatically divide the loading space. It is also possible to change the division or the dimensions of the loading space when loaded material is inserted by the loaded material being sensed in a possibly restricted region outside the vehicle, even before the loading area. If the system detects, for example, that the loaded material is too long, a loading space separator is moved, a ski bag opened or a rear seat bench folded. Even if the loaded material is high, it is possible, for example, to retract a loading space cover automatically after said loading material has been sensed.

In a development of the invention, protective devices are moved automatically into a predefined position as a function of the loading space state signal and the current velocity and/or driving situation of the vehicle.

In this way, protective devices can be extended only when the driving situation requires it. For example, a separating net can be moved into the securing position when the vehicle is traveling fast or braking severely. If appropriate, the separating net could also be extended in the case of a crash.

In a development of the invention, a separator is displaced or extended in or counter to a longitudinal direction of the vehicle, as a function of the loading space state signal and the current velocity and/or driving situation of the vehicle.

In this way, in the event of a crash, loaded material is prevented from stretching the separating net and moving suddenly into the head region of the vehicle occupants.

In a development of the invention, protective devices in the loading space of the vehicle can be moved into a protective position as a function of the loading space state signal and in response to a request signal.

In particular in the case of exclusive vehicles, sensitive loading space linings are used for visual reasons. Soiling, for example by pets or dirty loaded material, cannot then be removed again, or can be removed only with very great effort. By virtue of the fact that protective devices can be moved into a protective position in response to a request signal, it is possible to protect a sensitive loading space paneling against soiling, for example by means of a protective tarpaulin or other covers, even before material is loaded in. As a result, the laborious and visually unsatisfactory manual positioning of covers, troughs or the like in the loading space is eliminated. For example, a carpet in the loading space can be turned automatically so that a less sensitive underside faces the loading space. After the soiled loaded material is unloaded, the carpet can then be returned to its normal position by virtue of the fact that the visually more appealing loading space paneling faces the loading space. Furthermore, in order to protect side panels in the loading space, concealing devices, provided for example on the side windows, can be moved in front of the side panels as far as the floor of the loading space. This applies, for example, also to sections of the loading space paneling on a tailgate, and in the region of the rear sides of backrests facing the loading space. It would, for example, also be possible to provide an extendable protective device for the roof paneling of the loading space which is generally composed of bright and sensitive materials. It is particularly expedient to generate the request signal when the rear seat bench is folded as then there is a certain degree of probability that bulky and/or soiled loaded material can be expected.

In a development of the invention, the request signal is triggered by a user or sensors which sense environmental conditions such as precipitation and quality of the ground in the surroundings of the vehicle.

The triggering by a user can be carried out, for example, by means of a remote control system so that when a vehicle is loaded the loaded material does not initially have to be placed on the ground in order to prepare the loading space appropriately. If the vehicle is parked in heavy rain or on a dirty underlying surface, this could also be sensed by sensors so that protective devices are extended even before the vehicle is entered. Such protective devices could be installed either in a loading space, for example in order to protect a loading space paneling against soiling by pets climbing in, as well as in the passenger footwell or on the rear seats.

BRIEF DESCRIPTION OF THE DRAWINGS

Further features and advantages of the invention emerge from the claims and the following description of preferred embodiments of the invention in conjunction with the drawings, in which:

FIG. 5a shows a side view of a detail of the system from FIG. 4, FIG. 5b shows a plan view of the detail from FIG. 5a, FIG. 6 shows a schematic illustration of a system for protecting a loading space according to a fourth embodiment of the invention, FIG. 7 shows a schematic illustration of means for turning a loading space carpet in a system for protecting a loading space in accordance with a fifth embodiment of the invention.

DETAILED DESCRIPTION

Figure 1:
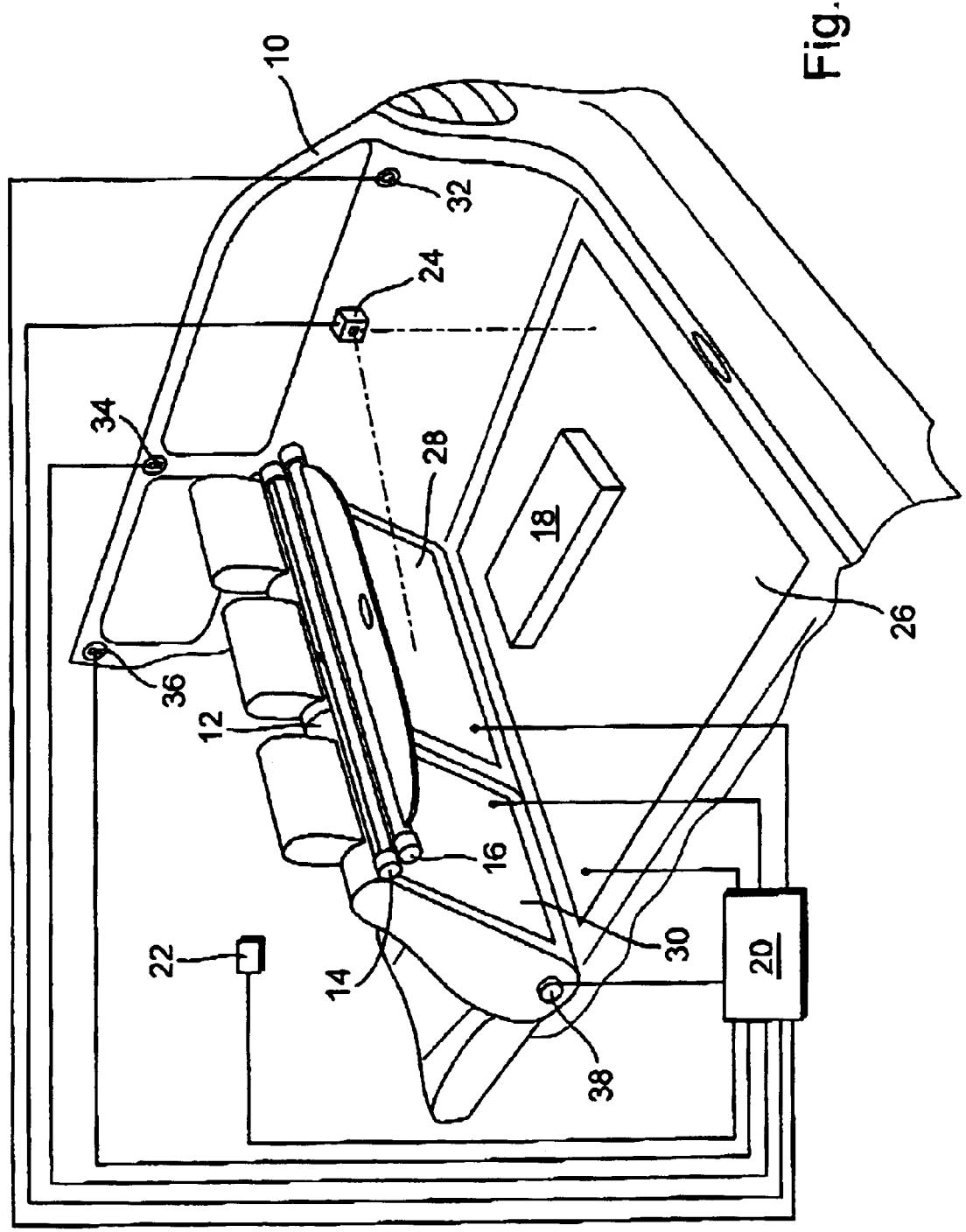
FIG. 1 shows a schematic illustration of a system for protecting a loading space, in accordance with a first embodiment of the invention.

In the illustration in FIG. 1 it is possible to see, in a perspective, partial illustration, a motor vehicle 10 which is embodied as what is referred to as an estate car (or station wagon) with a loading space open to the passenger compartment. The loading space and the passenger compartment are separated from one another by a rearseat backrest 12. The rearseat backrest 12 is divided so that it is also possible to fold only part of it forwards in order to increase the loading space. On a rear side of the backrest 12 of the rear seat which faces the loading space there is an extendable separating net 14 and an extendable loading space cover 16 provided. In the state which is illustrated in FIG. 1, both the separating net 14 and the loading space cover 16 are retracted. A parallelepipedal-shaped item 18 of loaded material is illustrated schematically in the loading space.

In the event of a collision of the vehicle 10 with an object of large mass, there is the risk that the loaded material 18 will move beyond the backrest 12 of the rear seat into the passenger compartment of the vehicle 10 and in doing so placing the occupants of the vehicle in danger. The loaded material 18 thus forms a potential hazard in the state of the loading space illustrated in FIG. 1. In conventional motor vehicles, it is the responsibility of a driver of the vehicle to detect the potential hazard of a loaded material 18 in the loading space and if appropriate take counter-measures, for example extend the separating net 14 or the crash-proof loading space cover 16.

According to the invention, a plurality of sensors are provided which sense the loaded material 18 in the loading space. Furthermore, sensors are provided for sensing the state of the protective devices of the loading space, specifically of the separating net 14 and of the loading space cover 16. The sensed sensor signals are processed in a control unit 20 and the loading space state signal which is generated in the control unit 20 is displayed to the driver of the motor vehicle by means of a display device 22.

In order to sense the loaded material 18 in the loading space, an optical sensor 24 is provided whose capture range covers the entire floor of the loading space. The capture range of the sensor 24 is configured here in such a way that even a loading space floor which is lengthened with the rear seat bench 12 folded over is completely sensed. The sensor 24 is thus used to detect whether there is loaded material 18 on the loading space floor. The sensor 24 is illustrated only by way of example with respect to its arrangement. In order to ensure the complete sensing of the loading space floor, a plurality of sensors 24 can be arranged in the vehicle. In addition to optical sensors, for example infrared sensors, it is also possible to use ultrasonic sensors or cameras with image processing means connected downstream.

In addition to the sensor 24, switching mats 26, 28 and 30 are provided for sensing loaded material 18 on the loading space floor. The switching mat 26 covers the entire loading space floor when the rear seat bench 12 is in its upright position illustrated in FIG. 1. The switching mat 28 is arranged on the right-hand, individually foldable part of the backrest 12 of the rear seat in FIG. 1, and as a result covers that section of the loading space floor which comes about when the right-hand section of the backrest 12 of the rear seat is folded forward in order to increase the loading space. The switching mat 30 is arranged on the rear side of that section of the backrest 12 of the rear seat which is on the left in FIG. 1, and as a result covers that section of the loading space floor which comes about when the left-hand part of the backrest 12 of the rear seat is folded forward in order to increase the loading space.

The switching mats 26, 28 and 30 output a signal if loaded material is placed on them. In the case illustrated in FIG. 1, the switching mat 26 would thus output a signal which signals the presence of loaded material 18 in the loading space. In addition to the purely qualitative sensing of the presence of loaded material in the loading space, the switching mats 26, 28 and 30 may, for example, also be configured in such a way that they output information both on the weight of the loaded item 18 and on its position in the loading space. In order to generate a position signal, the switching mats 26, 28 and 30 could be divided, for example, into individual sections or be configured as an array.

The simultaneous provision of an optical sensor 24 and of the switching mats 26, 28 and 30 is advantageous as it is possible to use the optical sensor 24 also to sense loaded material whose weight is too low to trigger the switching mats 26, 28 or 30. Conversely, the switching mats 26, 28 and 30 can be used to detect loaded material whose volume is too small to be detected by the optical sensor 24. In this way, the reliability when sensing loaded material is significantly improved.

The signals of the optical sensor 24 and of the switching mats 26, 28 and 30 are fed to the control unit 20.

Further sensors are provided for sensing the state of the protective devices in the region of the loading space, specifically of the separating net 14 and of the crash-proof loading space cover 16. In its pullout state, the loading space cover 16 is inserted by its end in the region of a sensor 32 which is arranged at the rear end of the right-hand side paneling of the loading space on the motor vehicle 10. The sensor 32 may be configured, for example, as a simple contact switch which is triggered when the lateral, rear end of the loading space cover 16 is inserted into the associated recess on the vehicle 10. A further sensor which detects the insertion of the rear left-hand end of the loading space cover 16 (not illustrated in FIG. 1 for reasons of clarity) is provided opposite the sensor 32 symmetrically with respect to a central plane in the longitudinal direction of the vehicle. The signal of the sensor 32 is fed to the control unit 20.

Sensors 34 and 36 are provided for sensing the state of the separating net 14. As has already been stated with respect to the sensor 32, the sensor which is of identical design to the sensors 34 and 36 is located on the opposite side of the vehicle (not illustrated in FIG. 1). The sensors 34 and 36 are arranged in the region of insertion points for the separating net 14 and detect whether the top end of the separating net is inserted into the insertion points which are respectively provided for it. The sensor 34 is located in the region of the insertion point into which the separating net has to be inserted if the backrest 12 of the rear seat is in the upright position illustrated in FIG. 1. The sensor 36 is arranged in the region of an insertion point into which the separating net has to be inserted if the backrest 12 of the rear seat is folded forward with respect to the position illustrated in FIG. 1 in order to increase the size of the loading space. The signals of the sensors 34 and 36 are fed to the control unit 20.

In order to place the control unit 20 in a position to decide in which insertion position of the separating net 14 there is a state which is safe for driving, a further sensor 38 is arranged in the region of the folding joint of the backrest 12 of the seat, the signal of which is also fed to the control unit 20.

If neither the sensor 24 nor the switching mats 26, 28 and 30 sense loaded material in the loading space, a state which is safe for driving is present, irrespective of the position of the separating net 14, of the loading space cover 16 and of the backrest 12 of the rear seat. Consequently, the control unit 20 generates a loading space state signal which indicates a state which is safe for driving. In this case, for example no signal is passed on to the display unit 22 so that the latter does not display any warning signal, or displays a green light signal, during the starting process.

If, on the other hand, the sensor 24 or the switching mats 26, 28 and 30 sense loaded material in the loading space, the control unit 20 checks whether the backrest 12 of the rear seat is in the upright or folded-over position, and whether the loading space cover 16 is inserted in the region of the sensor 32, or the separating net 14 is inserted in the region of the sensor 34 or of the sensor 36. Depending on this check, the control unit 20 then outputs a corresponding signal to the display unit 22. In the state illustrated in FIG. 1, the control unit 20 outputs a signal to the display unit 22 which represents an unsafe state. The display unit 22 then lights up in red in order to give the driver a warning message. In addition to the transmission of a warning message, it would, for example, also be possible to abort a starting process of the motor vehicle 10 by means of the signal from the control unit 20 so that the vehicle cannot be started until the control unit 20 signals a state which is safe for driving.

Figure 2:
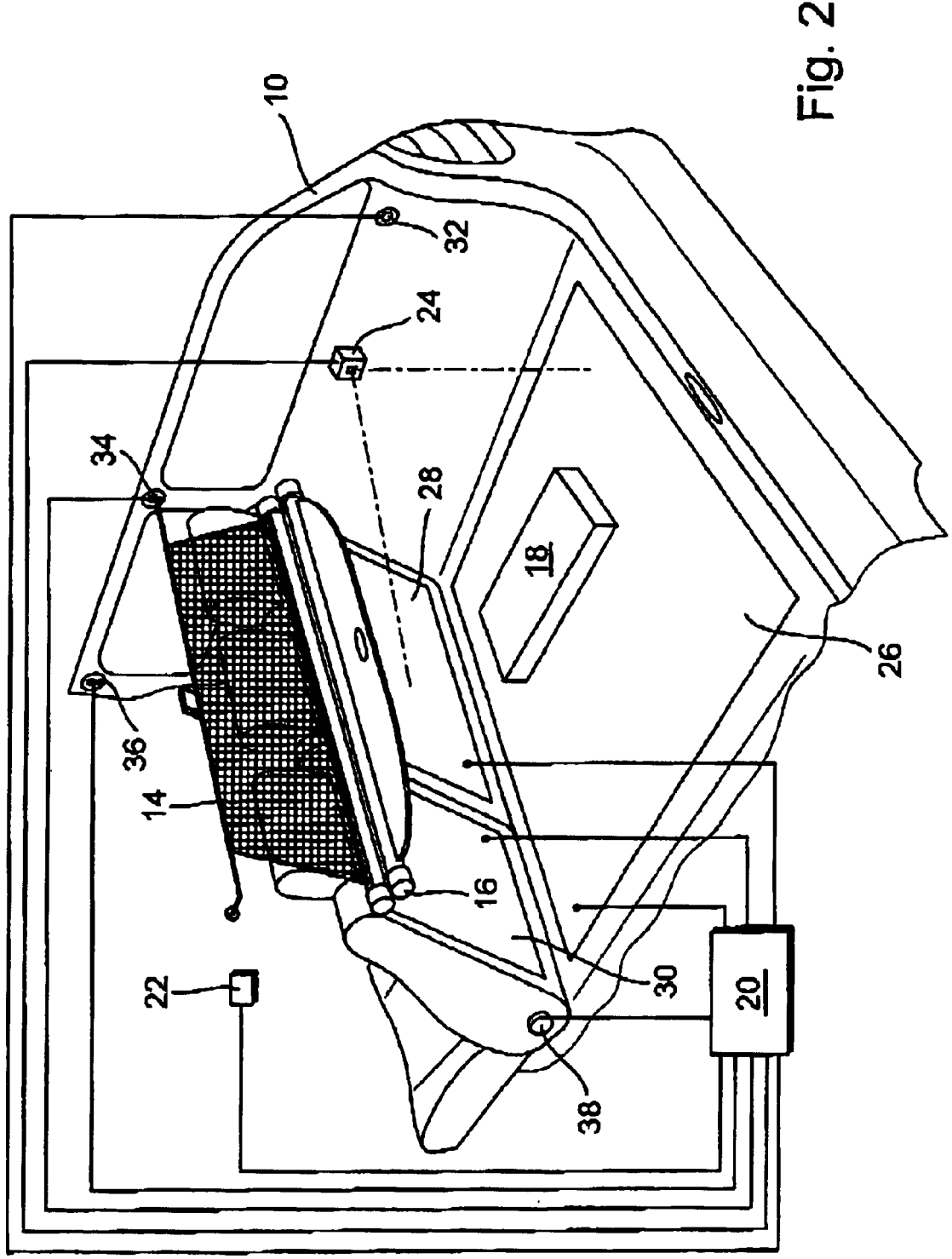
FIG. 2 shows the system from FIG. 1 with the separating net extended.

In the illustration in FIG. 2, the system for protecting the loading space from FIG. 1 is illustrated with the separating net 12 extended. As has already been explained in conjunction with FIG. 1, the item of loaded material 18 is sensed in the loading space by means of the sensor 24 and the switching mats 26, 28 and 30. However, in contrast to the state illustrated in FIG. 1, the control unit 20 detects that the separating net 14 is inserted in the insertion points in the region of the sensor 34 and the not illustrated sensor opposed thereto. Consequently, the control unit 20 detects a state which is safe for driving and consequently does not output a signal, or outputs a signal which represents the state which is safe for driving, to the display device 22.

Figure 3:
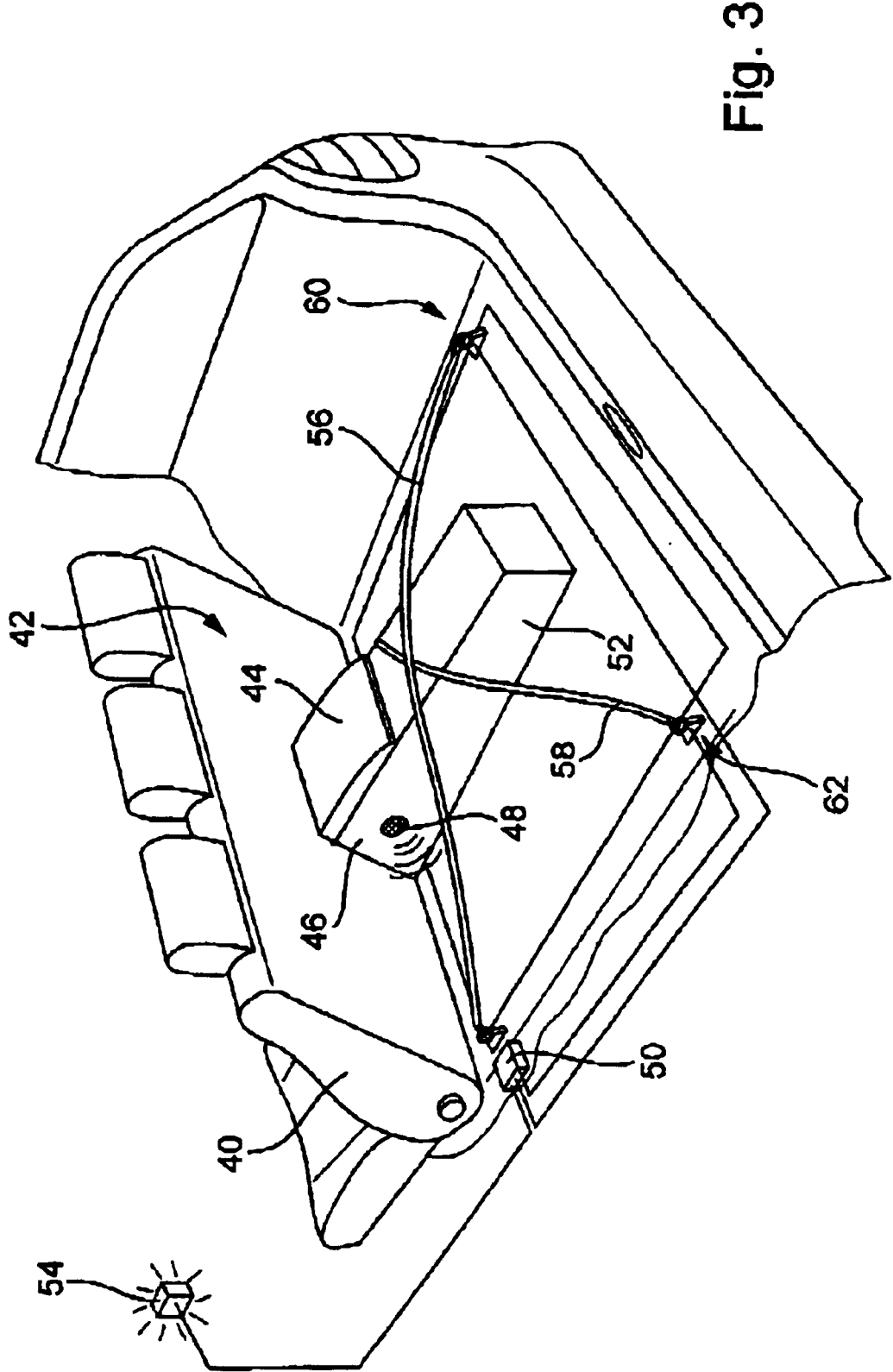
FIG. 3 shows a schematic illustration of a system for protecting a loading space according to a second embodiment of the invention.

A second embodiment of the invention is illustrated schematically in FIG. 3. The illustration in FIG. 3 shows the loading space of a motor vehicle which is bounded by a backrest 40 of the rear seat in the direction of travel. The backrest 40 of the rear seat is provided with what is referred to as a ski bag 42. This ski bag 42 has a pivotable flap 44 which is arranged on the rear side, facing the loading space, of the backrest 40 of the rear seat and can be folded over into the position shown in FIG. 3 and as a result exposes an opening in the backrest 40 of the rear seat for passing through long narrow objects, for example skis. When the flap 44 is folded over, side walls 46 made of material, which laterally bound the passing-through opening, are folded out. In the illustration in FIG. 3, only the left-hand side wall 46, as seen in the direction of travel, is shown. A transmitter 48, which outputs signals in the folded-out state of the flap 44 and of the side wall 46, is sewn into this left-hand side wall 46. The transmitter 48 may be embodied, for example, as what is referred to as transponder which outputs a transmission signal only when it receives electrical energy in the folded-out state. The signals which are output by the transmitter 48 are received by a receiver 50. When the ski bag 42 is folded out, this is thus detected by the receiver 50 by means of the signals received by the transmitter 48.

For example, the flap 44 of the ski bag 42 is prestressed in the closing direction by means of a spring so that whenever the flap 44 is opened, there is loaded material in the ski bag. When the ski bag 42 is opened, the receiver 50 and the integrated processing unit would thus detect that there is an unsafe state owing to the unsecured item of loaded material 52, and a corresponding signal is output to a display unit. The display unit 54 would then output, for example, a red warning signal.

In the state shown in FIG. 3, the item of loaded material 52 is however secured by fastening straps 56 and 58 so that a state which is safe for driving is actually present. The receiver and processing unit 50 detects the inserted state of the fastening straps 56 and 58 by means of sensors 60 and 62 which are provided in the region of insertion points for the fastening straps 56 and 58. The sensors 60 and 62 are embodied, for example, as force sensors which sense a tensile force of the fastening straps 56 and 58 on the respective insertion points. The signals of the sensors 60 and 62 are fed to the receiver and processing unit 50. In the state which is safe for driving (illustrated in FIG. 3), the receiver and processing unit 50 consequently outputs a signal to the display unit 54, in accordance with which signal a message "state safe for driving" is displayed, for example, by means of a green light.

Figure 4:
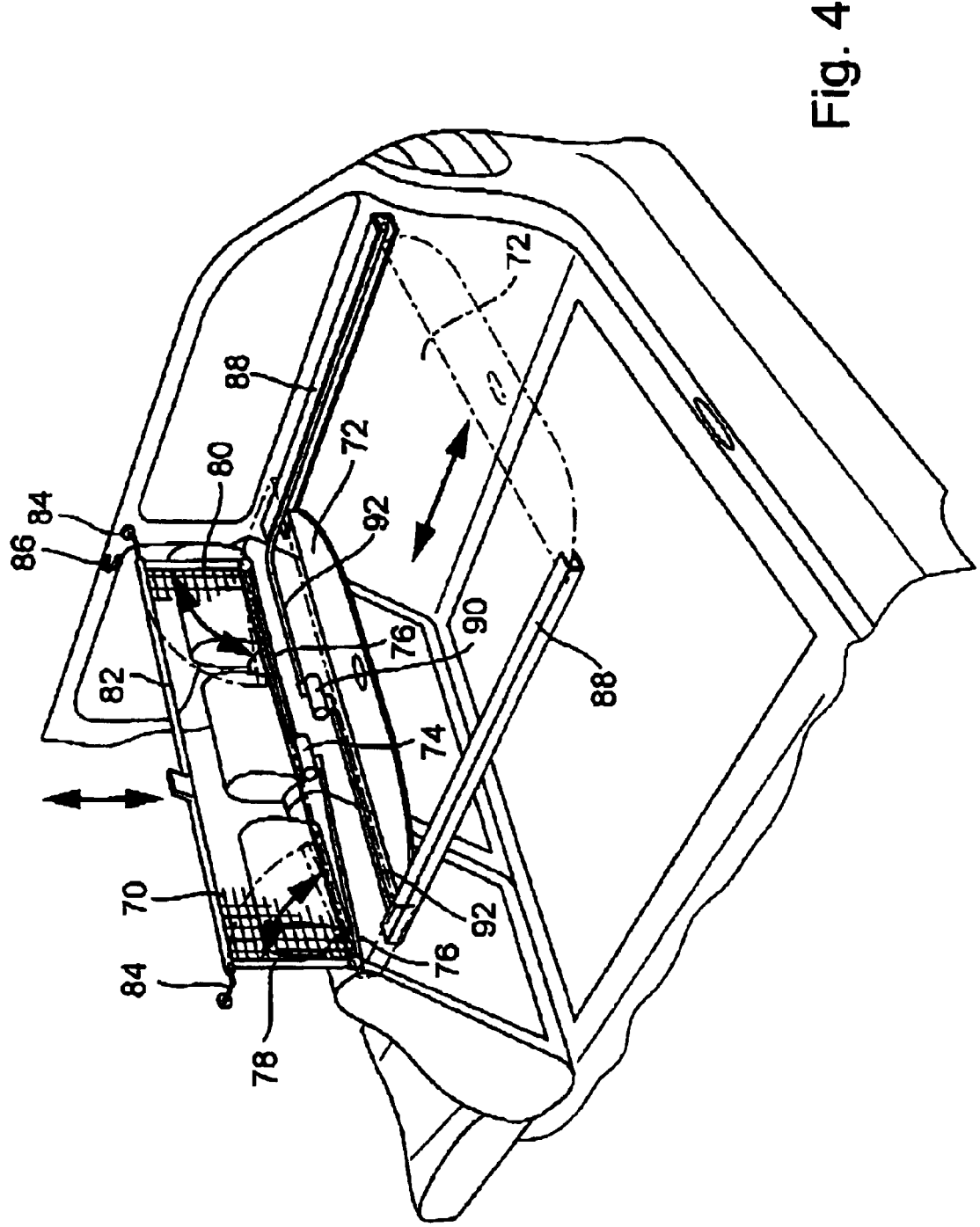
FIG. 4 shows a schematic illustration of a system for protecting a loading space according to a third embodiment of the invention.

In the illustration in FIG. 4, a system for protecting a loading space according to a third embodiment is illustrated in schematic and perspective view. No sensors for sensing loaded material or sensors for sensing the state of protective devices are shown in FIG. 4 only for the sake of clarity of the illustration. The system which is illustrated in FIG. 4 has an electrically extendable separating net 70 and an electrically extendable loading space cover 72. The separating net can be extended and retracted in the vertical direction of the vehicle, as indicated by a double arrow. The loading space cover 72 can also be retracted and extended in the longitudinal direction of the vehicle, as also indicated by a double arrow. In order to extend and retract the separating net 70, an electric motor 74 is provided which drives, by means of flexible shafts 76, a lever arm 78, on the left-hand side viewed in the direction of travel, and a lever arm 80, on the right-hand side viewed in the directional of travel. The lever arms 78 and 80 may each be pivoted here about an articulation point from a horizontal position (illustrated by dashed lines in FIG. 4) into a vertical position (illustrated by unbroken lines in FIG. 4). During the pivoting movement of the lever arms 78 and 80, their end which is opposite the respective articulation point slides on an upper crossmember 82 of the separating net 70 and thus displaces this crossmember 82 upward or downward.

In the vertical position of the lever arms 78 and 80 illustrated by unbroken lines, the separating net 70 is consequently extended completely, whereas in the horizontal position of the lever arms 78 and 80 illustrated by dashed lines it is retracted completely.

In order to lock the separating net 70 in a crash-proof fashion in its completely extended position, in each case a locking hook 84 is provided to the right and left of the upper crossmember 82. The locking hooks 84 each have a bent stem and a lens-shaped head which is arranged at the end of the stem. In the completely extended position of the separating net 70, the locking hooks 84 of the separating net 70 come to rest in front of insertion eyelets 86 which are attached to the right-hand and left-hand upper roof chord of the motor vehicle. The insertion eyelets 86 are of U-shaped construction. In the completely extended position of the separating net 70, the locking hooks 84 come to rest behind the U-shaped insertion eyelets 86, viewed in the direction of travel, said insertion eyelets 86 being opened counter to the direction of travel. In the case of an impact, the locking hooks 84 are thus moved into the U-shaped insertion eyelets 86 and held securely there for the duration of the impact. The precise design of the locking hooks 84 and of the insertion eyelets 86 is explained by reference to FIGS. 5a and 5b. It is important that, as a result of the configuration of the locking hooks and of the insertion eyelets 86, the separating net 70 is arranged in a crash-proof fashion and can nevertheless be retracted and extended electrically without requiring locking elements which can be activated electrically.

The loading space cover 72 which is of crash-proof design is guided in a guide rail 88, in each case on the right-hand and left-hand side walls of the loading space. In this way, the loading space cover 72 may be of crash-proof design as it is capable of restraining loaded material in the loading space in the event of an impact. The loading space cover 72 is moved by means of an electric motor 90 and two flexible shafts 92.

Signals for activating the electric motors 74 and 90 are issued in the system in FIG. 4 by a control unit (not illustrated). If, for example, loaded material is sensed in the loading space, this control unit outputs a signal to the electric motor 90 in order to close the loading space cover 72. If the loading space cover 72 is completely closed, this is detected by a suitable sensor and signaled back to the control unit. The control unit can thus then detect a state which is safe for driving. As an alternative to closing the loading space cover, the separating net 70 can be extended, the separating net 70 then being expediently extended if the loaded material in the loading space is too high to be able to still close the loading space cover 72. The height of the loaded material can be sensed by means of suitable sensors. However, the loading space cover 72 can also be provided, for example, with a contact switch in the region of its rear edge, said contact switch outputting a signal when it strikes against an object. After the detection of loaded material it would thus be possible to firstly try to completely close the loading space cover 72. If an excessively high item of loaded material were then detected by the contact switch at the rear end of the loading space cover 72, the loading space cover can return to its home position and the separating net 70 can be extended instead. Despite the loading space cover 72 being open, a state which is safe for driving would then be determined in this case.

The illustration in FIG. 5a shows the locking hooks 84 from FIG. 4 with the separating net completely extended, the locking hooks 84 being arranged directly in front of the U-shaped insertion eyelet 86 in this position. A direction of travel of the vehicle is indicated by means of an arrow 94. In the event of an impact, the locking hook 84 is moved in the direction 94 of travel by the braking acceleration which then occurs, thus engaging in the insertion eyelet 86. As is apparent from the illustration in FIG. 5b, the limbs of the insertion eyelets 86 are spaced apart and clear a space between them which is slightly larger than the stem of the locking hook 84, but significantly smaller than the diameter of the head of the locking hook 84. After the locking hook 84 has thus been moved into the insertion eyelet 86 in the direction 94 of travel, said locking hook 84 is then locked perpendicularly with respect to the direction 94 of travel. Consequently, the separating net can then restrain loaded material which impacts against it in the direction of travel.

As is also apparent from the illustration in FIGS. 5a and 5b, a guide track 96 for the head of the looking hook 84 is formed in the insertion eyelet 86. The head of the locking hook is then moved upward by this guide track 96 on insertion into the insertion eyelet 86, not only in the direction of travel but additionally perpendicularly with respect to the direction 94 of travel. As a result, in the event of a crash, the separating net 70 is stretched upward by the movement of the locking hook 84. During the insertion, the obliquely upwardly directed guide track 96 of the insertion eyelet 86 can, in the process, move the locking hook 84 significantly further upward than is apparent in the illustration in FIG. 5a, in order to bring about a significant stretching of the separating net. Stretching the separating net in the event of an impact makes it possible to prevent loaded material which strikes the separating net from stretching it and suddenly entering the head region of the occupants of the vehicle.

A fourth embodiment is illustrated schematically in FIG. 6. In the protection system illustrated in FIG. 6, covers can be automatically extended in order to protect the loading space paneling against soiling. Such soiling could occur, for example, when pets or a heavily soiled load is transported in the loading space of a motor vehicle. By virtue of the fact that the loading space covers can be extended automatically for the loading space paneling, the laborious and visually unsatisfactory covering of the loading space paneling by covers or troughs when transporting pets or a dirty load is eliminated.

The system illustrated in FIG. 6 has a control unit 100 to which signals of a sensor 102 for sensing loaded material in the loading space are fed. Furthermore, the control and processing unit 100 receives signals from a sensor 104 which senses the upright or folded state of a backrest 106 of a rear seat. In order to protect the loading space, an extendable cover 108 is provided on a rear door 110 of the loading space, an extendable cover 112 is provided over the floor 114 of the loading space, in each case an extendable cover 116 is provided on each side of the loading space and an extendable cover 118 is provided on the rear side, facing the loading space, of the backrest 106 of the rear seat.

The covers 108, 112, 116 and 118 can be extended or retracted by means of a corresponding control signal of the control unit 100. For this purpose, the control unit 100 receives a request signal, which is, for example, radio-controlled and triggered by pressing a pushbutton on a vehicle key 120. After the request signal is received, the control unit 100 firstly checks whether the sensor 102 senses loaded material in the loading space. If there is no loaded material in the loading space, the control unit 100 actuates the covers 108, 112, 116 and 118 in such a way that they extend completely and thus protect the loading space paneling against soiling.

As has already been described in the embodiments explained above, an extendable separating net 122 can also be actuated by means of the control unit 100.

The processing unit 100 additionally receives signals from a sensor 124. The sensor 124 is embodied, for example, as a rain sensor and/or as a sensor which senses an underlying surface in the surroundings of the motor vehicle. If precipitation which is sensed by the sensor 124 or a sensed quality of the ground, for example soil or snow, gives reason to believe that there is a risk of severe soiling being brought into the loading space by pets or loaded material, the processing unit 100 can move the covers 108, 112, 116 and 118 automatically and preventively into the protective position.

In the schematic illustration in FIG. 7, a device is shown in a system for protecting loading space, by means of which device a loading space carpet 130 can be turned automatically. Particularly exclusive vehicles are equipped with dirt-sensitive loading space carpets. The loading space carpet 130 has a visually appealing upper side which is satisfactory in terms of visual and haptic considerations, as well as an underside which is insensitive to dirt and can, for example, be washed. A front edge of the loading space carpet is guided at each of its two ends in a guide rail 132 which extends parallel to a loading space floor over the entire length of the loading space carpet 130. In the same way, a rear edge of the loading space carpet 130 is guided at its two ends in, in each case, a guide rail 134 which also extends parallel to the loading space floor and parallel to the guide rails 132. In order to turn the loading space carpet 130 automatically, the front edge of the loading space carpet 130 is moved in the direction of the arrow 136, by means of a suitable electric drive, for example. At the same time, the rear edge of the loading space carpet 130 is moved in the direction of the arrow 138 by means of a suitable drive. The loading space carpet 130 is indicated here in an intermediate position by dashed lines. If the front edge and the rear edge of the loading space carpet are each moved over the entire length of the guide rails 132 and 134, respectively, the underside of the loading space carpet 130 which is insensitive to dirt now faces upwards so that heavily soiled loaded material can thus be loaded without hesitation. A signal for turning the loading space carpet 130 may be outputted, for example in the way described in conjunction with FIG. 6, by a control and processing unit or under radio control, the loading space carpet 130 then being turned only if there is no loaded material on it.

Figure 8:
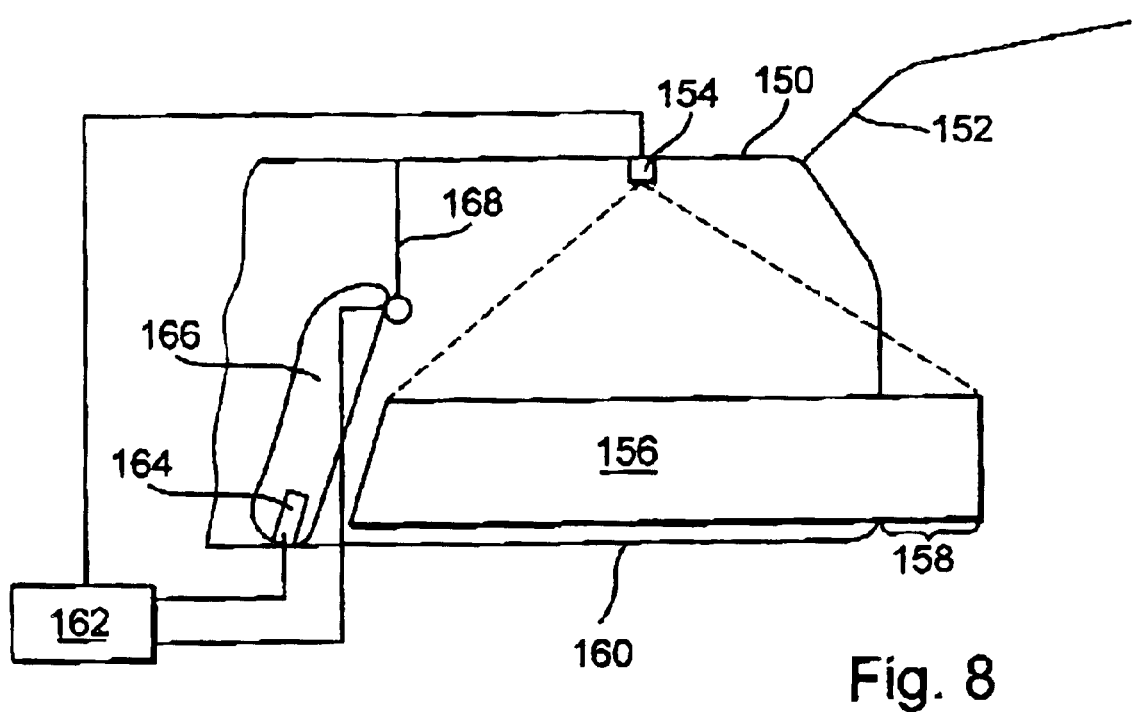
FIG. 8 shows a schematic illustration of a system for protecting a loading space according to a sixth embodiment of the invention.

In the illustration in FIG. 8, an estate vehicle (or station wagon) 150 with a foldable tailgate 150 is illustrated in part. A sensor 154 senses loaded material 156 not only in the loading space but also in a region 158 behind the end of a loading space floor 160. The signal of the sensor 154 is fed to a control unit 162. A drive 164 for folding a backrest 166 of a rear seat and a drive for extending a separating net 168 can be actuated by means of the control unit 162.

In the situation illustrated in FIG. 8, the item of loaded material 156 is too long to be accommodated completely in the loading space if the rear seat bench 166 is in its upright position. Consequently, the tailgate 152 can no longer be closed. By means of the signal of the sensor 154, the control unit 162 can detect that the item of loaded material 156 is too long. The control unit 162 then actuates the drive 164 in such a way that the rear seat bench 166 is folded into the horizontal position in which the loading space is lengthened. At the same time, the control unit 162 ensures that the separating net 168 is firstly retracted and extended again in the horizontal position of the rear seat bench 166, and moved into a crash-proof position. The system described with reference to FIG. 8 eliminates the need for the tedious reconfiguring of the loading space when bulky items of loaded material are loaded.

Figure 9:
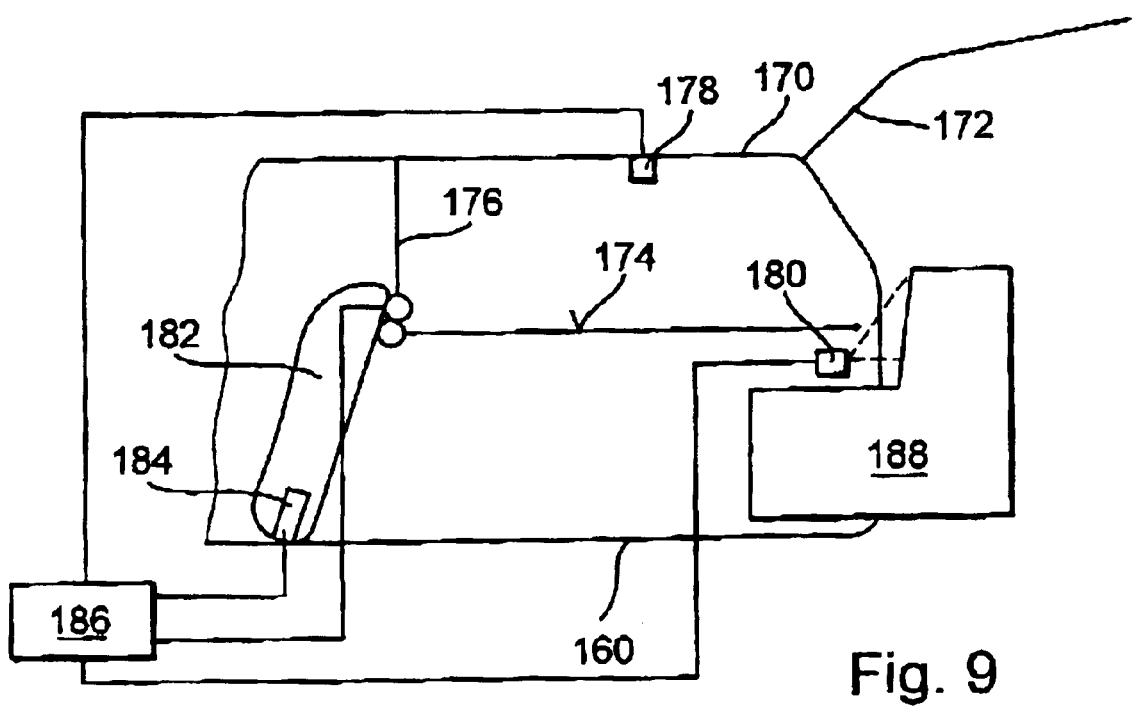
FIG. 9 shows a schematic illustration of a system for protecting a loading space according to a seventh embodiment of the invention.

A further system for protecting the loading space in accordance with an eighth embodiment is illustrated schematically in FIG. 9. Here too, a motor vehicle 170 has a tailgate 172 and a loading space, the loading space being capable of being covered by a horizontally extendable loading space cover 174. An electrically extendable separating net 176 separates the loading space from a passenger space. Sensors 178 and 180 are provided for sensing loaded material. A rear seat backrest 182 can be folded automatically by means of a drive 184. The signals of the sensors 178 and 182 are fed to a control unit 186 which can actuate the drive 184 in order to fold the rear seat bench 182, and the drives for the separating net 176 and the loading space cover 174.

The sensor 180 can be used to sense whether the height of an item of loaded material 188 which is to be loaded in exceeds the level of the loading space cover 174. In the situation illustrated in FIG. 9, the sensor 180 is used to sense that the height of the item loaded material 188 is so large that it cannot be arranged underneath the loading space cover. The control unit 186 receives the signal of the sensor 180 and consequently causes the loading space cover 174 to be retracted. The item of loaded material 188 can thus be easily inserted into the loading space. At the same time, the control unit 186 ensures that the separating net 176 is extended, and the vehicle 170 is thus in a state which is safe for driving.

It is to be noted that the various embodiments are provided with different features only for the sake of clarity of the drawings and for the sake of comprehension of the description. All the embodiments can also be partially combined with one another to form a system according to the invention for protecting a loading space.

What is claimed is:

1. System for protecting a loading space of vehicles having sensors for sensing loaded material in the loading space, sensing devices for sensing a state of protective devices in the loading space and a control unit for generating a loading space state signal as a function of the sensing of loaded material and the sensing of the state of the protective devices, wherein at least one said protective device is electrically operable and controllable to be automatically moved to a predefined position and wherein, when the at least one protective device does not reach the predefined position, a position state signal is generated that indicates an unsafe loading space state.

2. System for protecting the loading space according to claim 1, wherein the sensors provided for sensing loaded material sense position, size and/or weight of the loaded material.

3. System for protecting the loading space according to claim 1, wherein the sensors for sensing loaded material comprise components of a vehicle protection system.

4. System for protecting the loading space according to claim 1, wherein the sensing devices for sensing the states of the protective devices include one said sensing device having a transmitter or receiver which is arranged on a mobile one of said protective devices, and a receiver or transmitter which is arranged on the vehicle.

5. System for protecting the loading space according to claim 1, wherein the protective devices are automatically placed in the predefined position as a function of the loading space state signal.

6. System for protecting the loading space according to claim 1, wherein the protective device is moved automatically into the predefined position as a function of the loading space state signal and a current velocity and/or driving situation of the vehicle.

7. System for protecting the loading space according to claim 6, wherein one of said protective devices comprises a separating member that is located between the loading space and passenger compartment which is displaced, pretensioned or extended in or counter to a longitudinal direction of the vehicle as a function of the loading space state signal and the current velocity and/or driving situation of the vehicle.

8. System for protecting the loading space according to claim 1, wherein the protective devices in the loading space of the vehicle can be moved into a protective position as a function of the loading space state signal or in response to a request signal.

9. System for protecting the loading space according to claim 8, wherein the request signal is triggered by a user or by sensors which sense at least one environmental condition of precipitation and quality of ground adjacent the vehicle.

10. System for protecting the loading space according to claim 1, wherein depending on the position state signal, which indicates the unsafe loading space state, at least another said protective device is automatically moved to a predetermined position.

11. System for protecting the loading space according to claim 1, wherein the protective device comprises an electrically operable loading space cover.

12. System for protecting the loading space according to claim 1, wherein the protective device comprises an electrically operable separating net.

13. A system for protecting a loading space of a vehicle comprising:
- at least one protective device located within the vehicle and movable between at least a first position for protecting one or more loaded articles in the loading space of the vehicle and a second position enabling access to the loaded articles;
- at least one protective device sensor for sensing the first or second position of said at least one protective device;
- at least one article sensor for sensing a presence of one or more loaded articles in the loading space of the vehicle; and
- a control unit for generating a loading space state signal as a function of 1) the sensing of loaded articles, and 2) the sensing of the position of the at least one protective device, wherein said protective device is automatically moved to the first position in response to the loading space state signal.

14. The system for protecting the loading space of a vehicle according to claim 13, wherein said at least one protective device comprises at least one of an electric powered extendable loading space cover movable along a guide rail and an electric powered extendable net.

15. The system for protecting the loading space of a vehicle according to claim 13, including a display for displaying the loading space state signal to inform an operator of the vehicle of an unsafe load article.

16. The system for protecting the loading space of a vehicle according to claim 13, including an electric motor for the automatic moving of the at least one protective device to the first position in response to the loaded space state signal output from said control unit, the protective device in the first position providing a barrier protecting an operator of the vehicle from contact with a loaded article due to a sudden vehicle stop or vehicle accident.

17. The system for protecting the loading space of a vehicle according to claim 13, wherein said at least one load detecting sensor comprises sensors for sensing size, location within the loading space, and weight of a loaded article.

18. The system for protecting the loading space of a vehicle according to claim 13, wherein said load detecting sensor provides an output to a vehicle antitheft system.

19. The system for protecting the loading space of a vehicle according to claim 13, wherein the protective device sensor includes a transmitter or receiver arranged on the movable protective device and a respective corresponding receiver or transmitter arranged on the vehicle.

20. The system for protecting the loading space of a vehicle according to claim 13, wherein the automatic moving of the protective device in response to the loading space state signal is adjusted by a velocity or driving condition of the vehicle.

* * * * *